United States Patent
Achzet et al.

(10) Patent No.: US 12,298,023 B2
(45) Date of Patent: May 13, 2025

(54) AIR EMISSION STACK, CONTROLLED EMISSION RELEASE

(71) Applicant: ECOLAB USA INC., Saint Paul, MN (US)

(72) Inventors: John Achzet, Saint Paul, MN (US); Jared R. Freudenberg, Saint Paul, MN (US); George Milyo, Jr., Saint Paul, MN (US); Alison Marwitz, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 537 days.

(21) Appl. No.: 17/457,487

(22) Filed: Dec. 3, 2021

(65) Prior Publication Data

US 2022/0178577 A1    Jun. 9, 2022

Related U.S. Application Data

(60) Provisional application No. 63/199,238, filed on Dec. 15, 2020, provisional application No. 63/199,043, filed on Dec. 3, 2020.

(51) Int. Cl.
*F24F 11/77* (2018.01)
*A01M 13/00* (2006.01)
(Continued)

(52) U.S. Cl.
CPC ........... *F24F 11/77* (2018.01); *A01M 13/003* (2013.01); *F24F 8/10* (2021.01); *F24F 11/0001* (2013.01);
(Continued)

(58) Field of Classification Search
CPC .......... F24F 11/77; F24F 11/0001; F24F 8/10; F24F 2110/64; F24F 2110/30; F24F 7/06; F24F 2007/001; A01M 13/003
(Continued)

(56) References Cited

U.S. PATENT DOCUMENTS

| | | | |
|---|---|---|---|
| 1,518,434 A | 12/1924 | Klein | |
| 3,097,916 A * | 7/1963 | Dawson | B65D 88/742 422/31 |

(Continued)

FOREIGN PATENT DOCUMENTS

JP          H0272820 A       3/1990

OTHER PUBLICATIONS

Thompson et al., Commercial Cooling of Fruits, Vegetables, and Flowers, University of California, Division of Agriculture & Natural Resources, Publication 21567, 2008.

*Primary Examiner* — Avinash A Savani
*Assistant Examiner* — Dana K Tighe
(74) *Attorney, Agent, or Firm* — McKee, Voorhees & Sease, PLC (57) ABSTRACT

Many import and export regulations require fumigation of goods, such as products or commodities, to ensure that non-native pests are not introduced. The fumigating process can involve placing the goods in a sealed containment system, and introducing the sealed good to a fumigant, such as methyl bromide gas, for a predetermined amount of time. After fumigation, regulations may require how to dispense the fumigant. The fumigant can be exhausted through fans, baffles, dampers, filters, and a chimney, as part of an emission system, in a controlled manner. The controlled manner can include combining the fumigant with ambient air and releasing or exhausting the combination over an amount of time, which mitigates pollution by the fumigant. The time-period is not specific, and instead is the time needed to meet regulatory requirements.

18 Claims, 7 Drawing Sheets

(51) Int. Cl.
    *F24F 8/10*       (2021.01)
    *F24F 11/00*    (2018.01)
    *F24F 7/00*       (2021.01)
    *F24F 7/06*       (2006.01)
    *F24F 110/30*   (2018.01)
    *F24F 110/64*   (2018.01)

(52) U.S. Cl.
    CPC ........... *F24F 2007/001* (2013.01); *F24F 7/06* (2013.01); *F24F 2110/30* (2018.01); *F24F 2110/64* (2018.01)

(58) Field of Classification Search
    USPC ...................................... 454/3, 173, 178, 341
    See application file for complete search history.

(56) References Cited

U.S. PATENT DOCUMENTS

| | | | |
|---|---|---|---|
| 3,226,144 A | 12/1965 | Lomaz | |
| 3,682,225 A | 8/1972 | Redden | |
| 3,925,942 A | 12/1975 | Hemmelsback | |
| 4,033,367 A | 7/1977 | Johnston | |
| 4,576,014 A | 3/1986 | Miller et al. | |
| 4,956,042 A | 9/1990 | Hubert et al. | |
| 5,277,031 A | 1/1994 | Miller et al. | |
| 5,607,652 A * | 3/1997 | Hellmuth | G21F 9/001 422/26 |
| 5,614,463 A | 3/1997 | Kawasaki et al. | |
| 5,641,463 A | 6/1997 | Langhart | |
| 5,904,909 A | 5/1999 | Yates et al. | |
| 6,047,496 A | 4/2000 | Leitner et al. | |
| 6,422,253 B1 | 7/2002 | Glynn et al. | |
| 6,450,188 B1 | 9/2002 | Langhart | |
| 6,890,252 B2 * | 5/2005 | Liu | B08B 15/002 454/61 |
| 7,435,378 B2 | 10/2008 | Richardson et al. | |
| 7,682,560 B2 * | 3/2010 | Brash | A01M 17/008 422/123 |
| 7,908,791 B1 | 3/2011 | Brash | |
| 9,028,750 B2 * | 5/2015 | Fernandez | A01M 13/003 422/298 |
| 9,423,128 B2 * | 8/2016 | Gans | F24F 7/025 |
| 11,460,203 B2 * | 10/2022 | Desrochers | F24F 11/30 |
| 2001/0029695 A1 | 10/2001 | Schott et al. | |
| 2007/0251331 A1 * | 11/2007 | Charlat | F24F 11/0001 73/861.77 |
| 2008/0022583 A1 | 1/2008 | Kurashima et al. | |
| 2008/0251514 A1 * | 10/2008 | Fitzpatrick | A23L 3/3409 220/86.1 |
| 2010/0071258 A1 | 3/2010 | Molnar et al. | |
| 2018/0072492 A1 * | 3/2018 | Holt | B65D 88/121 |

* cited by examiner

AIR EMISSION STACK, CONTROLLED EMISSION RELEASE

CROSS REFERENCE TO RELATED APPLICATIONS

This application claims priority under 35 U.S.C. § 119 to provisional patent applications U.S. Ser. No. 63/199,043, filed Dec. 3, 2020, and U.S. Ser. No. 63/199,238, filed Dec. 15, 2020. The provisional patent applications are herein incorporated by reference in their entirety, including without limitation, the specifications, claims, and abstracts, as well as any figures, tables, appendices, or drawings thereof.

FIELD OF THE INVENTION

The invention relates generally to systems, methods, and/or apparatus for treating goods and exhausting emissions. More particularly, but not exclusively, the invention relates to systems, methods, and/or apparatus for controlling the release of air, chemicals, and other potentially hazardous pollutants used to fumigate goods.

BACKGROUND OF THE INVENTION

As stated in U.S. Pat. No. 7,435,378, which is hereby incorporated by reference in its entirety, it is important and/or legally required to fumigate commodities and other goods that are imported into one country from another to kill pests that are not native to the receiving country and that therefore pose a threat to its agriculture. For example, fumigation was most often accomplished using methyl bromide gas. While many uses of methyl bromide have been curbed by environmental laws, quarantine fumigation of perishable agricultural products, especially fresh fruit, will continue into the future.

Fruits and produce are normally transported under refrigeration to slow the metabolic processes associated with ripening and decay. In particular, fruit must be warmed to about 40° F. for fumigation, since methyl bromide boils at 38.5° F. and must be used in the gaseous state to be effective.

Fumigation is accomplished by sealing the fruit, produce, or other goods in an enclosure (e.g., containers, tarped sealed stacks, rooms, shrouded areas, etc.) and filling the enclosure with methyl bromide or like chemical at a sufficient concentration and temperature, and for a sufficient period of time, to kill the target pest. The fruit is then removed from the enclosure to a cold storage facility to slowly reduce the temperature of the fruit to around 32° F. This cooling process can take as few as two to three days to accomplish, or as many as seven days or more. The actual cooling time depends on the type of packaging material (wooden crates, corrugated cartons, plastic bins, etc.), the configuration of palletized product placed in the cooling chamber, the efficiency of the refrigeration system, target temperature, and other variables. It is known in the art that handling and moving the fruit inherently increases the risk of damage, such as bruising, which lowers the commercial value of the commodity.

As disclosed in the '378 patent, an apparatus forms a chamber enclosing the goods on a surface and includes a canopy that is substantially impermeable to flowable materials, such as gas, liquid, or a combination thereof. The apparatus further includes an upper perimeter for supporting an upper portion of the canopy; a lower perimeter for supporting a lower portion of the canopy; a support structure for supporting the upper perimeter and lower perimeter; and a gasket in communication with the lower perimeter, the gasket being deformable to substantially seal the chamber by compressing the gasket against the surface. In use, the upper perimeter and lower perimeter are fixedly attached to a support structure via a perimeter support. The apparatus may be moveable with respect to the support structure. The lower perimeter may be raised and compressed against the upper perimeter to provide room to place the goods on the surface, then lowered away from the upper perimeter to be placed in proximity to the surface, thereby forming the chamber. The apparatus may also include an intermediate support structure for providing support to the canopy.

In such a system, the goods are fumigated in an efficient manner. However, according to various local, national, and/or international regulations, the timing of exposure to the goods by the fumigating agent, as well as the release of the fumigating agent from the system and/or apparatus can be tightly controlled. It can be vital that the fumigating agent is not exposed to the goods for too long, but the various regulations may also require the release of the fumigating agent be controlled so as to comply with local, state, federal, and country regulations around the release of fumigant to comply with safety standards such as OSHA, fence line, and other short and long term exposure limits as defined by said bodies.

Therefore, there is a need in the art for systems, methods, and/or apparatus to control the release (i.e., the emission) of a fumigating agent from a fumigation system or apparatus that is controllable to comply with various laws and regulations, but also mitigates damage to the goods, such as by over exposure of the fumigant.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to time control the release/emission of hazardous air pollutant to regulate emission levels to protect health, safety, and environment while executing on critical, required fumigation treatment of core supply line imports and exports.

It is still yet a further object, feature, and/or advantage to fluidly connect with existing fumigation shrouds or containers (i.e., fumigation containment systems) and/or apparatus to controllably remove the fumigant from the systems to a release location in a timely and/or controlled manner.

It is a further object, feature, and/or advantage to utilize duct work, dampers, and/or fans to controllably release a fumigant from a system for fumigating goods and/or commodities.

It is yet a further object, feature, and/or advantage to filter and/or capture at least some of the pollutant before releasing the same.

It is still a further object, feature, and/or advantage to automate the release of the pollutant from the fumigation system.

It is yet another object, feature, and/or advantage to sense a concentration of a fumigant with a sensor and using air flow to automatically adapt the total flow and/or fresh air bleed in to normalize concentration of the release of the fumigant.

The apparatus, systems, and/or methods disclosed herein can be used in a wide variety of applications. For example, it is included that generally any good, commodity, machine, or otherwise.

It is preferred the apparatus be safe, cost effective, and durable.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

The system, apparatus, and/or method can be incorporated into systems that accomplish some or all of the previously stated objectives, such as fumigating goods and/or other commodities.

According to some aspects of the present disclosure, a controlled emission system for use with one or more sealed fumigation shrouds or containers includes an emission chimney, at least one duct fluidly connecting each of the one or more sealed fumigation shrouds or containers and the emission chimney, a fumigation exhaust fan inline with each of the at least one duct to move a fumigant from the one or more sealed fumigation shrouds or containers and towards the emission chimney, and at least one chimney exhaust fan to move the fumigant through and out the emission chimney.

According to at least some aspects and/or embodiments, the at least one duct fluidly connecting each of the one or more sealed fumigation shrouds or containers comprises two ducts.

According to at least some aspects and/or embodiments, the system further comprises a first fumigation fan inline with a first duct and a second fumigation fan inline with a second duct, wherein each of the first and second ducts combine at the emission chimney.

According to at least some aspects and/or embodiments, the at least one chimney exhaust fan comprises first and second chimney exhaust fans to direct the fumigant through and out the chimney.

According to at least some aspects and/or embodiments, each of the at least one ducts combine at the emission chimney.

According to at least some aspects and/or embodiments, the system further comprises a controlled damper inline with and between the at least one duct and the emission chimney to control the amount of fumigant passing into the emission chimney.

According to at least some aspects and/or embodiments, the system further comprises at least one bleed air inlet comprising a bleed air motorized damper to control an amount of air to be allowed into the emission chimney.

According to at least some aspects and/or embodiments, the fumigation exhaust fan is capable of moving fumigant at approximately 12,000 CFM and the at least one chimney exhaust fan is capable of moving fumigant at approximately 60,000 CFM.

According to at least some aspects and/or embodiments, the system operates in a first configuration wherein the fumigant is continuously moved from the containment system through and out the emission chimney; and operates in a second configuration wherein the fumigant is moved in an interrupted manner based upon volume or time to move an amount of fumigant at a time through and out the emission chimney.

According to at least some aspects and/or embodiments, the system further comprises at least one pollutant sensor inline with the at least one duct to measure an amount of pollutant in the fumigant moving through the duct.

According to at least some aspects and/or embodiments, the system further comprises at least one airflow measuring sensor to measure volumetric flow of the fumigant in the emission system.

According to additional aspects of the disclosure, a method of exhausting a fluid containing a pollutant from at least one sealed fumigation shrouds or containers includes directing the fluid and pollutant, via a duct and fumigation exhaust fan, from the at least one sealed fumigation system and towards an emission chimney, combining the fluid and pollutant with ambient air in the emission chimney, and exhausting, via at least one chimney exhaust fan, the combined fluid, pollutant, and ambient air, through and out the emission chimney in a controlled manner.

According to at least some aspects and/or embodiments, the method further comprises sensing an amount of pollutant in the fluid being directed from the at least one sealed fumigation system and towards the emission chimney.

According to at least some aspects and/or embodiments, the method further comprises measuring the volumetric flow of the combined fluid, pollutant, and ambient air moving through the emission chimney.

According to at least some aspects and/or embodiments, the ambient air is inlet via one or more bleed in dampers.

According to at least some aspects and/or embodiments, the method further comprises controlling, via a motorized control damper, the movement of the fluid and pollutant from the at least one sealed fumigation system towards the emission chimney through the duct.

According to at least some aspects and/or embodiments, the method further comprises exhausting the combined air, pollutant, and ambient air at approximately 120,000 CFM through the emission chimney.

According to at least some aspects and/or embodiments, the movement of the fluid and pollutant comprises a continuous movement wherein the movement is generally uninterrupted until substantially all of the pollutant is removed from the at least one sealed system.

According to at least some aspects and/or embodiments, the movement of the fluid and pollutant comprises an interrupted movement, wherein a volumetric amount of fluid and pollutant are moved at a time, and the process continues until substantially all of the pollutant is removed from the at least one sealed system.

According to yet additional aspects of the disclosure, a combined fumigation and emission system includes a fumigation system comprising at least one shroud covering a product and sealed to receive a fumigating gas, and an emission system to exhaust the fumigating gas in a safe and controlled manner, said emission system comprising an emission chimney, at least one duct fluidly connecting the fumigation system and the emission chimney, a fumigation exhaust fan inline with each of the at least one duct to move the fumigating gas from the one or more sealed fumigation shrouds or containers and towards the emission chimney, and at least one chimney exhaust fan to move the fumigating gas through and out the emission chimney.

According to at least some aspects and/or embodiments, the system further comprises at least one bleed in duct to allow in a controlled amount of ambient air to mix with the fumigating gas before exhaust via the emission chimney.

According to at least some aspects and/or embodiments, the system further comprises at least one filter in the at least one duct or the emission chimney to filter out contaminants from the fumigating gas.

According to at least some aspects and/or embodiments, the system further comprises a flow sensor to measure the volumetric flow of the fumigating gas, and wherein the fumigation exhaust fan and/or the at least one chimney fan adjustable based upon the sensed volumetric flow of the flow sensor.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

Many facilities, including import and export locations, require products to be fumigated. Such fumigation is intended to remove any non-native insects, pests, or otherwise (e.g., mites) that could be introduced by the import and/or export of the goods, commodities, or other objects. For example, fruit is often imported into the United States from a foreign location. A fumigant, such as methyl bromide, is be used to fumigate said fruit at the port of import as a condition of entry into the U.S. Likewise, goods are exported from the U.S. or other countries, and the goods can be fumigated as well so as to mitigate the exposure and/or introduction of the unwanted pests or the like before delivery. The addition of a fumigant could also be used for decontamination purposes.

In order to fumigate the product, an amount of fumigant, such as methyl bromide, is introduced to the product in a desired or regulated concentration for a regulated amount of time. The amount of time is balanced such that a substantial amount of any potential pest or mite is eradicated, while not damaging the product. This is especially important when the product being fumigated is perishable commodity or the like. In addition, while perishable commodities may be used with the fumigation process, other types of products, including goods, machines, logs, or generally any other type of article can also be fumigated in the manner provided.

To ensure good fumigation, systems and/or methods have been provided. For example, U.S. Pat. No. 7,435,378, which is co-owned and incorporated by reference in its entirety, provides for a canopy, shroud, or tarp-like system in which a substantially impermeable canopy is used to cover the article being fumigated. The canopy is then sealed around its perimeter and the fumigant is introduced for an amount of time to properly fumigate said product. However, upon reaching the time allotted for the fumigation of the product, the fumigant needs to be evacuated, emitted, or otherwise exhausted therefrom. As noted, when the product being fumigated is a perishable item, it is important to make sure to remove the fumigant in a timely manner so as to not damage, ruin, or otherwise cause issues to the product.

In addition, while local rules, laws, and/or regulations control the fumigation process itself, additional regulations, rules, and/or laws also dictate the safe removal of the fumigant from the sealed fumigation process. In the past, the sealed canopy may simply be opened to allow the fumigant to be released into the ambient environment. However, as many fumigants are considered pollutants, this could be hazardous to the ambient environment. Therefore, regulations have dictated the way and/or manner of exhausting a fumigant, such as that used in the '378 patent.

Therefore, as will be understood, aspects, embodiments, and/or other disclosures herein provide for ways to control the exhaust, emission, and/or release of a fumigant from a fumigation process, such as that shown and/or described in the '378 patent. However, it should be appreciated that the fumigation process shown in the '378 patent is not the sole or only fumigation process for which the exhaust systems of the invention can be used. It should be appreciated that any of the aspects, components, and/or embodiments disclosed can be used with generally any fumigation process to control the release, exhaust, and/or emission of a fumigant and/or other pollutant to an ambient environment to comply with laws, policies, rules, and/or regulations.

Figure 1:
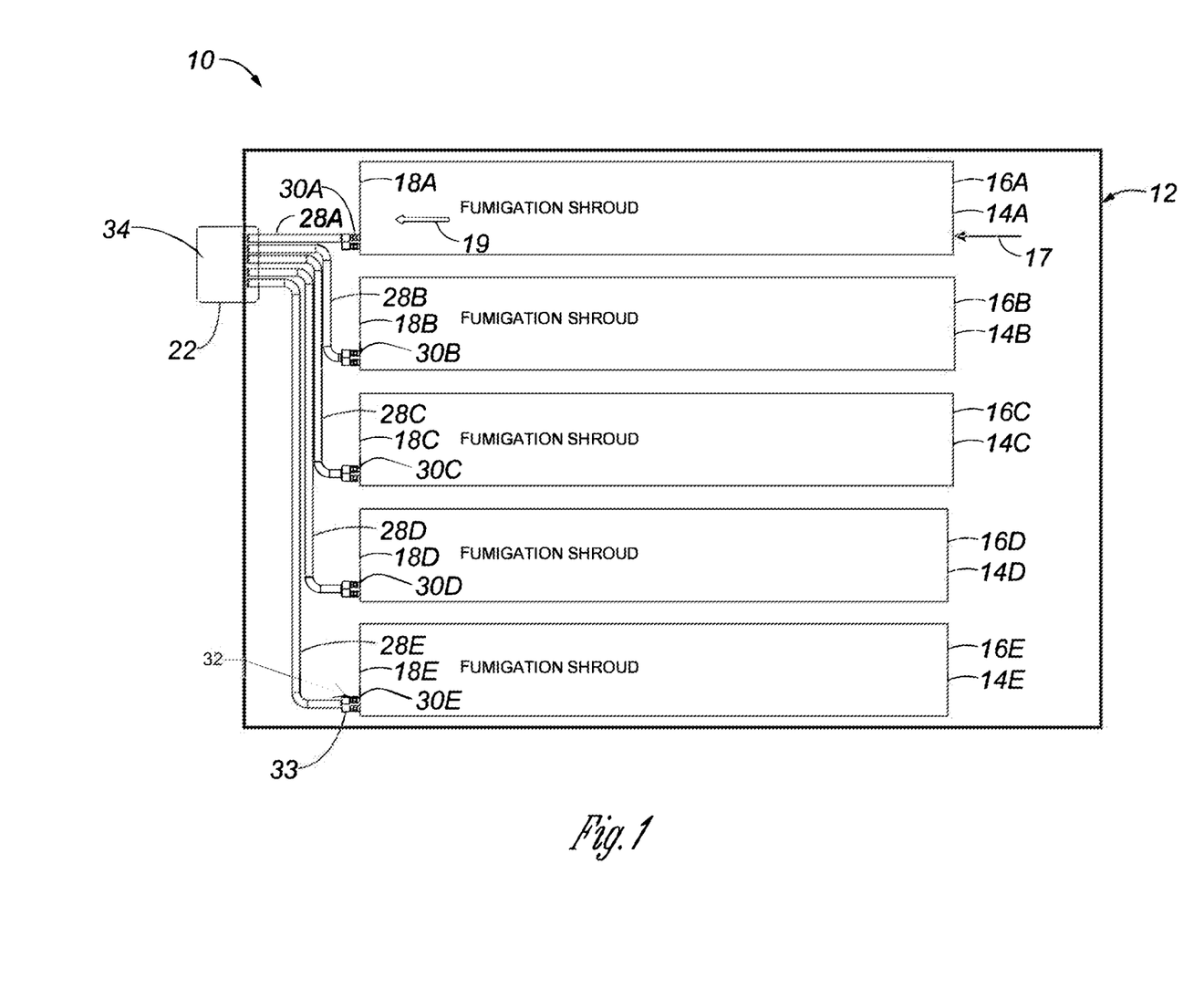
FIG. 1 is a schematic layout of a fumigation system including aspects of the invention.

FIG. 1 is an exemplary depiction of a fumigation system 10. The fumigation system 10 shown in FIG. 1 includes a housing 12, which can be a warehouse, moving dock, or the like. For example, according to some embodiments, the housing 12 may be an enclosed area or could be an open area for which a good or article, such as a product or commodity, is stored either before export or after import. To initiate a fumigation process, the product is positioned in stacks or otherwise in a controlled manner to best make use of the space available. As shown in FIG. 1, five stacks, lines, or other organization of products are being fumigated in the process shown. In addition, and in conjunction with the '378 patent, said products shown in FIG. 1 are being fumigated using the process of the '378 patent. For example, shrouds or canopies 14A-E are shown to be covering the products being fumigated. As shown the shrouds 14A-E have varying sizes, which indicates varying amounts of product, organization of the product, and/or size of product being fumigated by the system. This is simply shown to illustrate that the fumigation system can be used with generally number, size and/or amount of product to be fumigated.

As noted, the fumigation process includes sealing the product with the shrouds 14A-E, and then introducing a fumigant thereunder. The fumigant interacts with the product under said shrouds until such time as has been allocated, allowed, and/or desired to fumigate said product. For example, a fumigant such as methyl bromide may be introduced such as via the direction of the arrow 17 shown with shroud 14A until such time that the fumigation process has been complete. At the end of the allocated time, the fumigant used with the shrouds 14A-E should be exhausted in a controlled manner to comply with rules and/or regulations. Therefore, it is desired to move the fumigant from the shroud entrances 16A-E and out the shroud exits 18A-E, such as in the direction of the exit arrow 19 shown with regards to shroud 14A in FIG. 1.

To further control the release and/or exhaust of the fumigant from the shrouds 14A-E, an emission system 20 is provided and used in conjunction with the system 10. As will be understood, the emission system 20 is fluidly connected to receive the fumigant and any additional fluid (e.g., air) from the shrouds and to controllably release the fumigant via an emission chimney 22 into an ambient environment. The controlled release of the fumigant to the ambient environment is controlled in a number of ways, and includes the addition of ambient air to dilute the concentration of fumigant in the fluid, and also a timed control of release of the fumigant and/or ambient air to an ambient environment, wherein the controlled release allows for the dilution of the fumigants upon combination with the ambient environment around the emission chimney 22.

As will be understood, a number of fans, diffusers, dampers, filters, sensors, and the like may be utilized with the fumigation system 10 to both control the movement of the fumigant from one of the plurality of shrouds 14A-E, through the emission system 20, and out an exhaust, such as an emission chimney 22.

As best shown in FIG. 1, a plurality of ducts are used to direct and transfer the fumigant from one or all of the plurality of shrouds 14A-E and towards the emission chimney 22. For example, while FIG. 1 shows five shrouds used for fumigation 14A, B, C, D and E, at least five transfer ducts 28A, 28B, 28C, 28D, and 28E will be used to move the fumigation from the shrouds towards the chimney 22. However, it should be appreciated that more ducts could be utilized with each of the shrouds and/or fewer ducts be included wherein duct sections are combined between the shrouds and the chimney so as to control the release from multiple shrouds utilizing a common duct system. Thus, it should be appreciated that the exact configuration and/or number of transferred ducts 28 need not be specific and/or be limited to that disclosed in FIG. 1 and the other figures, and instead, be determinative based on the fumigation needs for a particular system and/or location.

It should be appreciated, that while the shrouds 14A-14E and disclosed in the '378 patent are considered to be used with the system as disclosed herein, additional and variable containment or holding systems may be used. For example, it is envisioned that some products being fumigated (e.g., timber or the like) are typically stored in shipping containers. Instead of moving the timber from the shipping containers to the shrouds for fumigation, it is to be appreciated that the shipping containers could be connected, such as via the transfer ducts, to the chimney for exhaust of the fumigant. In such a situation, the fumigant would be added to the interior of the shipping containers and would still be directed through the transfer ducts 28 via the same or similar system of fans towards the chimney 22, where the fumigant could be release in the manner required based upon local rules and/or regulations. In such a situation, the tubing could be corrugated or the link and there would be no tarp used. Instead, the tubes would connect directly with the chimney, and the fumigant released accordingly. The chimney could therefore be transportable or otherwise portable to be used in a number of locations and with a number of storage devices. It should be noted that, accordingly to some embodiments, the containers would not be covered with shrouds. However, this could done as well.

Still further, other containment or holding systems for holding different items for fumigation are to be considered as part of the invention. This includes varying the size (e.g., area or volume), material, or the like. As materials are generally shipped in a variety of containment systems, it should be appreciated that the fumigation system, including the exhaust portions thereof, could be adapted to be easily set up to connect to the containment systems and be able to direct and exhaust the fumigant in a timely manner so as to avoid damaging the items being fumigated, while still exhausting in a manner so as to comply with rules and/or regulations for exhaustion of the same.

Therefore, aspects of embodiments should be considered to cover any size and/or configuration of a containment system for holding a number of items to be fumigated, including different types of materials, variable volume systems that can be adjusted, as needed, and other changes to meet the items being fumigated. In any such configuration, the fumigation system 10 will still be connectable to such containment system, such as via the transfer ducts 28, to allow for the movement and discharge of the fumigant.

Also shown in FIG. 1, and in conjunction with the transfer ducts 28, are a number of fumigation exhaust fans 30. The fumigation exhaust fans 30 are used to draw air from the plurality of shrouds 14 and to direct the fumigant therein and through the ducts 28. According to some exemplary embodiments, a single fan 30 may be used to draw the fumigant and other fluids from the fumigation shrouds 14 and into and through the ducts. However, in the exemplary embodiment shown in the figures, first and second exhaust fans 32, 33 are shown with regard to each of the fumigation shrouds 14A-E to efficiently and adequately draw enough of the fumigant and any other fluid from the fumigation shrouds 14-E and into the corresponding duct systems 28A-E. Still further, while each of the fumigation shrouds 14A-E shown in FIG. 1 include fumigation exhaust fans 30A-E, including first and second exhaust fans, it should also be considered and part of the disclosure that each duct transfer system 28A-E include variations of the number of fans associated therewith. For example, if a particular fumigation shroud of a system is larger or is used to fumigate a large amount of goods and/or products, more fans may be used to exhaust said fumigation shrouds, while smaller areas of fumigation via a shroud can include fewer number of fans. Still further, different sizes and fan capacities could also be used to control the movement of fluid. This can further optimize the system to best direct the fumigant and any other fluid associated therewith from the fumigation shrouds and towards the emission system 20 for controlled release therefrom.

According to at least some embodiments, the first and second exhaust fans 32, 33 associated with the fumigation shrouds 14 may be model TBI-CA-3H36-30 and manufactured by Greenheck Fan Corporation. However, it should be appreciated that other models and/or manufacturers be utilized for the exhaust fans. According to at least some embodiments, it is desirable that the air flow associated with the exhaust fans for the shrouds be capable of moving air at approximately 12,000 cubic feet per meter (CFM). In addition, the type of fans shown may be axial fans. However, as noted, additional types of fans and/or air flow requirements and outputs may be utilized as part of the invention and with the system.

Figure 2:
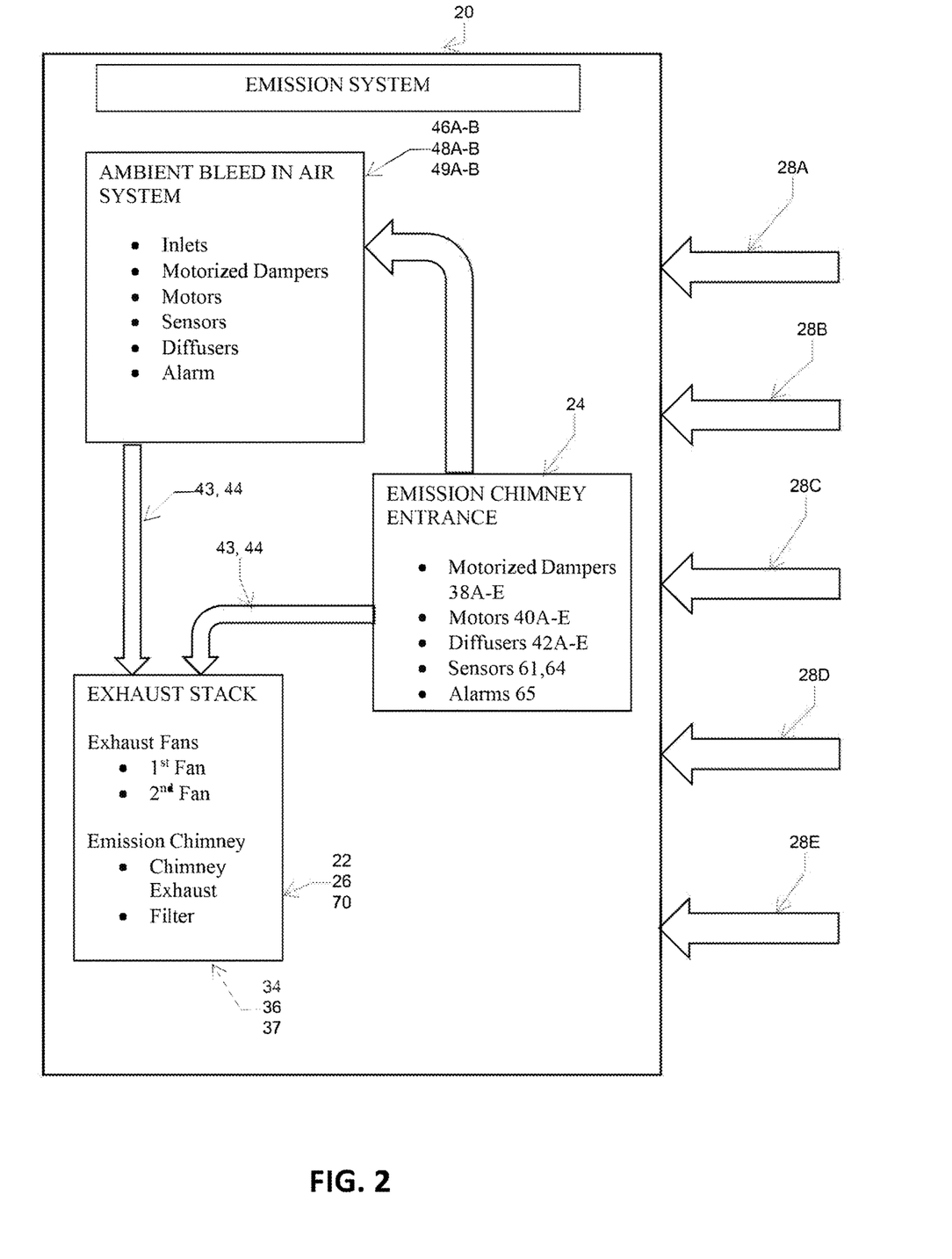
FIG. 2 is schematic layout showing components of an emission system for exhausting fumigant from a shroud system.

As shown in FIG. 2, the transfer ducts 28A-E further are connected to the emission system 20. The ducts pass into an entrance 24 of the emission system 20 where the fumigant and any other associated fluid is further directed and/or controlled. As shown in FIG. 2, at or near the entrance 24 to the emission system, a motorized and controllable damper 38 is controlled by an associated motor 40. The damper is utilized to control the amount of fumigant, fluid, or otherwise into the emissions system 20. For example, the damper can be controlled to be opened and/or closed in varying capacity (e.g., from 0-100% opened) to control the amount of fluid passing therethrough. Such a damper is controlled via the motor 40. In addition, it should be appreciated that each of the transferred ducts 28A-E include an associated damper 38A-E controlled by an associated motor 40A-E as shown in FIG. 2. According to at least some aspects and/or embodiments, a damper, such as a motorized damper 38 controlled by a motor 40, can be used to allow an amount of air through the system. Each of the transfer ducts may be separately and variably controlled based on the amount of fumigant passing therethrough to further meet the requirements of exhaust and/or emission via the system 20.

In addition, it should be appreciated that other fluid flow manipulators, such as diffusers, manifolds, or the like, such as a diffuser 42A-E, could be used to control or manipulate the air/fumigant/fluid flow through the system.

As noted with respect to FIG. 2 and other figures, the ducts 28A-E are connected to an emission system 20. As will be understood, the emission system 20 includes an emission chimney 22, in which the flow from the shrouds 14 is controllably released exhaust the system. In addition, the emission system may include additional components. Such components can include dampers, diffusers, ambient air inlets, sensors, fluid flow monitors, additional ducts, additional fans, filters, and the like, which will aid in moving the mixture of air and fumigant through the emission system 20 and out the chimney 22 in a controlled manner. Such a controlled manner will attempt to control the amount of fumigant released to the ambient environment of the system to comply with regulations. This will mitigate the parts per million (PPM) of the fumigant in the ambient environment, which will be done to attempt to comply with local, regional, and/or national rules and regulations for the emission of potentially harmful pollutants in the ambient environment.

Figure 3:
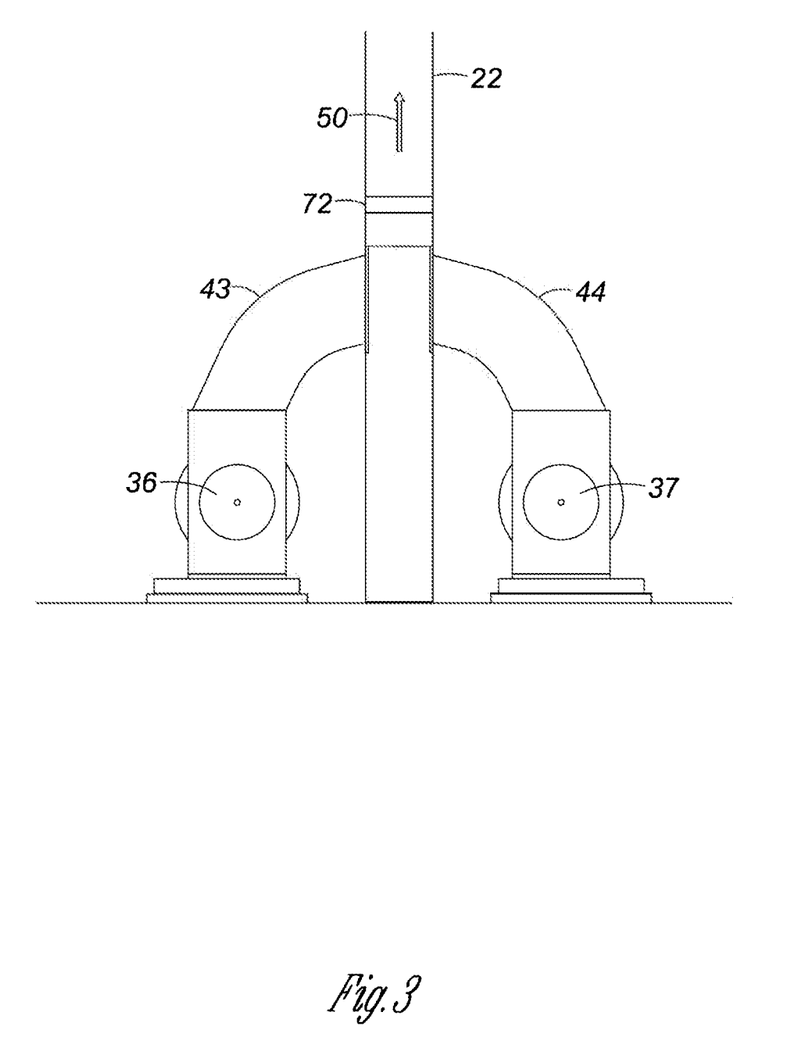
FIG. 3 is an exemplary end view showing chimney exhaust fans and chimney of an emission system according to aspects of the invention.

Also shown in FIG. 2 are chimney exhaust fans in the form of a first chimney exhaust fan 36 and a second chimney exhaust fan 37. The first and second chimney exhaust fan 36, 37 are associated with the chimney 22 via inlet ducts 43, 44. This is best shown in FIG. 3. While the transfer ducts move the fumigant and the associated gases towards the emission system 20 including the chimney, the chimney exhaust fans 36, 37 will further aid in drawing the fumigant and associated gases, via the inlet ducts 43, 44, into the chimney and through the chimney 22 and out the exhaust 26 thereof. This is shown generally by the arrow 50 in FIG. 3.

As noted, aspects of the emission system can include the introduction of ambient air to mix with the fumigant in the emission system 20. The ambient air can be used to dilute the fumigant and other gases as it is moved through the emission system in the controlled manner and before it is released via the chimney 22. Such ambient air can be introduced as shown in FIG. 2 into the system 20. The ambient air can be introduced as bleed in air to allow an amount of ambient air to be drawn into the system in a bleed in manner. The introduction of the bleed in ambient air can be utilized to further dilute such fumigant before it is controllably released via the chimney. However, the use of bleed in ambient air need not be required in all embodiments.

While the system 20 of the figures shows an emission stack including an emission chimney 22, it should be appreciated that additional emission transfer devices may be included, such as in a standalone manner or in conjunction with said chimney 22. For example, according to at least some aspects of some embodiments, the system will include temporary locations, such as temporary holding tanks, that receive the fumigant. The holding tanks can vary in size (e.g., 500 gallons according to some embodiments), but can be connected to the chimney 22 such that the fumigant in the holding tank will be controllably released via the chimney in the manner described herein. The holding tank can aid in controlling the timed release of the fumigant, such as when the fumigant needs to be removed from the containment system, but cannot be released all at once due to the time constraints and rules for releasing the fumigant into the ambient environment. The holding tanks could take a number of forms, including, but not limited to, metallic cylinders, boxes, pliable materials that can expand with the addition of a fluid, or generally any type of containment that can be used to store, for any period of time, a gaseous material to mitigate leakage or release of the material.

Additional aspects of the disclosure include the use of air flow sensors 52. An air flow sensor is a sensor to sense the volumetric flow of air or other gases passing through said sensor. The determination of the airflow at the fan inlets and before passing into the chimney ducts 43, 44 can indicate the operational speed required for the chimney exhaust fans 36, 37. For example, if a lower amount of air flow is introduced to the fans, the fans may be directed to be operated at such corresponding speeds to move the air coming in at the desired speed to move through the ducts 43, 44 up and into and through the chimney 22, such as in the direction of the arrow 50 in FIG. 3. The air flow sensor provides additional information that could indicate to a manual and/or automatic operation of any components of the system, such as to require an opening and/or closing of the bleed in ambient air dampers, the transfer duct dampers and/or the operation of the transfer fans or chimney fans.

FIG. 3 shows the inclusion of a filter 72 in line with the chimney 22. A filter 72, such as a carbon filter or the like, could be included in the chimney, in the inlet ducts 43, 44, and/or any of the transfer ducts 28A-E or otherwise positioned in the system to further filter out unwanted aspects associated with the fumigant and/or other gases. For example, it is possible for VOC's or other harmful pollutants or hazardous materials to be mixed with the air flow and/or fumigant and/or gases passing through the system 20. Therefore, a filter 72, such as a carbon filter or the like, could be included to filter out said unwanted VOC's or other pollutants before the air and pollutant combination is released via the chimney 22 into the ambient environment. A carbon filter uses a bed of activated carbon to remove contaminants and impurities, using chemical adsorption. Each particle, or granule, of carbon provides a large surface area, or pore structure, allowing contaminants the maximum possible exposure to the active sites within the filter media. Activated carbon works via a process called adsorption, whereby pollutant molecules in the fluid to be treated are trapped inside the pore structure of the carbon substrate. Carbon filters are known, in particular charcoal carbon filters are known to remove chlorine, and other particles including VOCs.

In addition, this filtration could take place before reaching the chimney 22, such that a sensor, such as a VOC sensor 61 as shown best in FIG. 6, could indicate the level of VOC in the moving fluid to further control the timed release of the fluid via the system or even a shutdown of the system. While a carbon filter has been disclosed as being used, it should be appreciated that other types of filters for filtering out VOC and other unwanted pollutants may be included as well and can included but not be limited to wood base activated carbon filters and coconut base activated carbon filters can be used. Such filters provide filtering of the air and/or steam mixtures to remove contaminants from the air to provide a clean exhaust therefrom.

Figure 4:
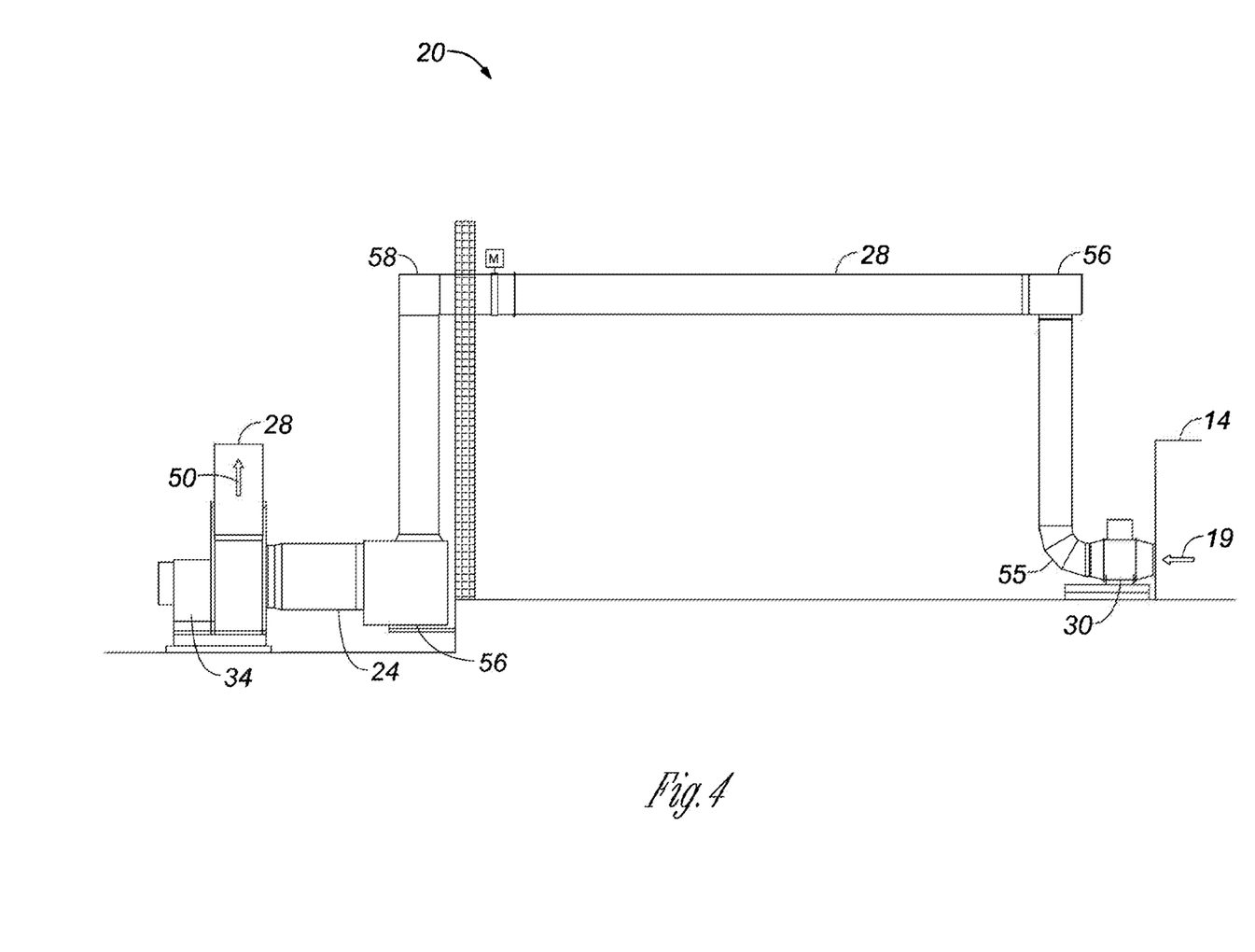
FIG. 4 is an exemplary side elevation view of exhaust ducts of an emission system.

FIG. 4 is another exemplary depiction of an emission system 20 shown as a side elevation view of an embodiment including aspects as disclosed herein. For example, the depiction of FIG. 4 includes one of the fumigation shrouds 14 and transfer ducts 28 passing into the emission system 20. As shown in FIG. 4, the shroud includes an exit arrow 19 indicating the draw of the fumigant and other gases from the shroud 14 via the exhaust fan 30 and into the transfer duct system 28. A flexible duct 55 is positioned and connected to the fan 32 direct the gas from the shroud and into the duct system 28. The exhaust fans 34 are shown to draw the air in which will combine with the fumigant in the chimney 22 for emission and release therefrom. As will be understood, such a flow from the shroud 14 via the arrow 19 and out the chimney 22 via the arrow 50 can be controlled at any location therebetween, such as via the dampers, diffusers and/or operation of either of the shroud exhaust fan 30 and/or chimney fans 34.

Figure 5:
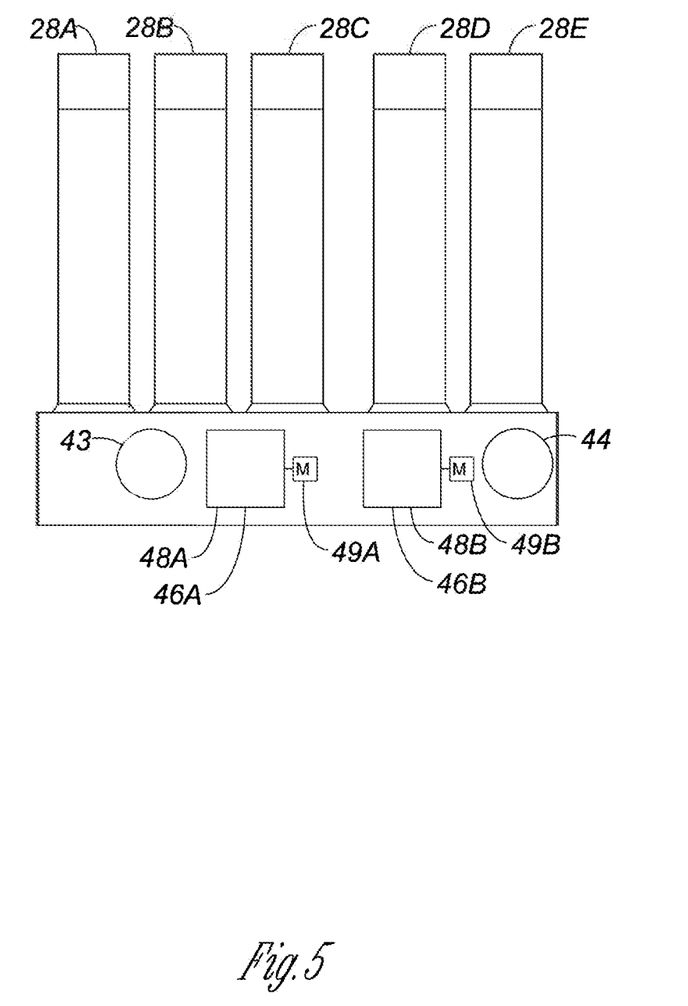
FIG. 5 is an exemplary top plan view of ducts according to aspects of the invention.

FIG. 5 is another view of the emission system 20 showing the location of the bleed in ambient inlets 46A, 46B. As indicated, the inlets 46A, 46B allow for an amount of ambient air to be introduced into the system where it can be combined with the fumigant and other gas moving through the system to be directed into the inlet ducts 43, 44, where it is moved through the chimney 22 and out the exit and exhausted into the ambient environment.

A user interface is how the user interacts with a machine. The user interface can be a digital interface, a command-line interface, a graphical user interface ("GUI"), oral interface, virtual reality interface, or any other way a user can interact with a machine (user-machine interface). For example, the user interface ("UI") can include a combination of digital and analog input and/or output devices or any other type of UI input/output device required to achieve a desired level of control and monitoring for a device. Examples of input and/or output devices include computer mice, keyboards, touchscreens, knobs, dials, switches, buttons, speakers, microphones, LIDAR, RADAR, etc. Input(s) received from the UI can then be sent to a microcontroller to control operational aspects of a device.

The user interface module can include a display, which can act as an input and/or output device. More particularly, the display can be a liquid crystal display ("LCD"), a light-emitting diode ("LED") display, an organic LED ("OLED") display, an electroluminescent display ("ELD"), a surface-conduction electron emitter display ("SED"), a field-emission display ("FED"), a thin-film transistor ("TFT") LCD, a bistable cholesteric reflective display (i.e., e-paper), etc. The user interface also can be configured with a microcontroller to display conditions or data associated with the main device in real-time or substantially real-time.

Still further, any of the components of the system could be programmed via an algorithm or the like to automatically change operation of any of the components thereof, based on feedback of any of the sensors or other reading mechanisms thereof. For example, a processor or the like can be associated with the system to receive information including the operational feeds of any and all of the fans, the status and orientation of the dampers, as well as any of the feedback sensors including the airflow, VOC, methyl bromide, or any other sensor associated with system. Such feedback could then be analyzed via the algorithm to determine if any change needs to be made to any said components. This could be in the form of opening or closing any of the dampers via the motors, increasing or decreasing the operational speed of any of the fans, or even just determining a proper amount of time has been allocated to the release of the fumigant and gas combination through the system according to meet any regulatory standards associated with the location of use of the system.

The system, such as the emission system 20 and/or fumigation system, will preferably include an intelligent control (i.e., a controller) and components for establishing communications. Examples of such a controller may be processing units alone or other subcomponents of computing devices. The controller can also include other components and can be implemented partially or entirely on a semiconductor (e.g., a field-programmable gate array ("FPGA")) chip, such as a chip developed through a register transfer level ("RTL") design process.

A processing unit, also called a processor, is an electronic circuit which performs operations on some external data source, usually memory or some other data stream. Non-limiting examples of processors include a microprocessor, a microcontroller, an arithmetic logic unit ("ALU"), and most notably, a central processing unit ("CPU"). A CPU, also called a central processor or main processor, is the electronic circuitry within a computer that carries out the instructions of a computer program by performing the basic arithmetic, logic, controlling, and input/output ("I/O") operations specified by the instructions. Processing units are common in tablets, telephones, handheld devices, laptops, user displays, smart devices (TV, speaker, watch, etc.), and other computing devices.

The memory includes, in some embodiments, a program storage area and/or data storage area. The memory can comprise read-only memory ("ROM", an example of non-volatile memory, meaning it does not lose data when it is not connected to a power source) or random access memory ("RAM", an example of volatile memory, meaning it will lose its data when not connected to a power source). Examples of volatile memory include static RAM ("SRAM"), dynamic RAM ("DRAM"), synchronous DRAM ("SDRAM"), etc. Examples of non-volatile memory include electrically erasable programmable read only memory ("EEPROM"), flash memory, hard disks, SD cards, etc. In some embodiments, the processing unit, such as a processor, a microprocessor, or a microcontroller, is connected to the memory and executes software instructions that are capable of being stored in a RAM of the memory (e.g., during execution), a ROM of the memory (e.g., on a generally permanent basis), or another non-transitory computer readable medium such as another memory or a disc.

Generally, the non-transitory computer readable medium operates under control of an operating system stored in the memory. The non-transitory computer readable medium implements a compiler which allows a software application written in a programming language such as COBOL, C++, FORTRAN, or any other known programming language to be translated into code readable by the central processing unit. After completion, the central processing unit accesses and manipulates data stored in the memory of the non-transitory computer readable medium using the relationships and logic dictated by the software application and generated using the compiler.

In one embodiment, the software application and the compiler are tangibly embodied in the computer-readable medium. When the instructions are read and executed by the non-transitory computer readable medium, the non-transitory computer readable medium performs the steps necessary to implement and/or use the present invention. A software application, operating instructions, and/or firmware (semi-permanent software programmed into read-only memory) may also be tangibly embodied in the memory and/or data communication devices, thereby making the software application a product or article of manufacture according to the present invention.

The database is a structured set of data typically held in a computer. The database, as well as data and information contained therein, need not reside in a single physical or electronic location. For example, the database may reside, at least in part, on a local storage device, in an external hard drive, on a database server connected to a network, on a cloud-based storage system, in a distributed ledger (such as those commonly used with blockchain technology), or the like.

Thus, the system 10 may include such a configuration with instructions on operation, including any instructions to handle any anomalies, changes in condition, or other changes within or outside set thresholds to continue or stop operation based upon updated information processed by the system. The control can be utilized for any of the sensors, motors, alarms, or other controls of the system in order to control an aspect of the system in an automated or semi-automated manner with continual feedback and variation to the system or any components thereof.

Figure 6A:
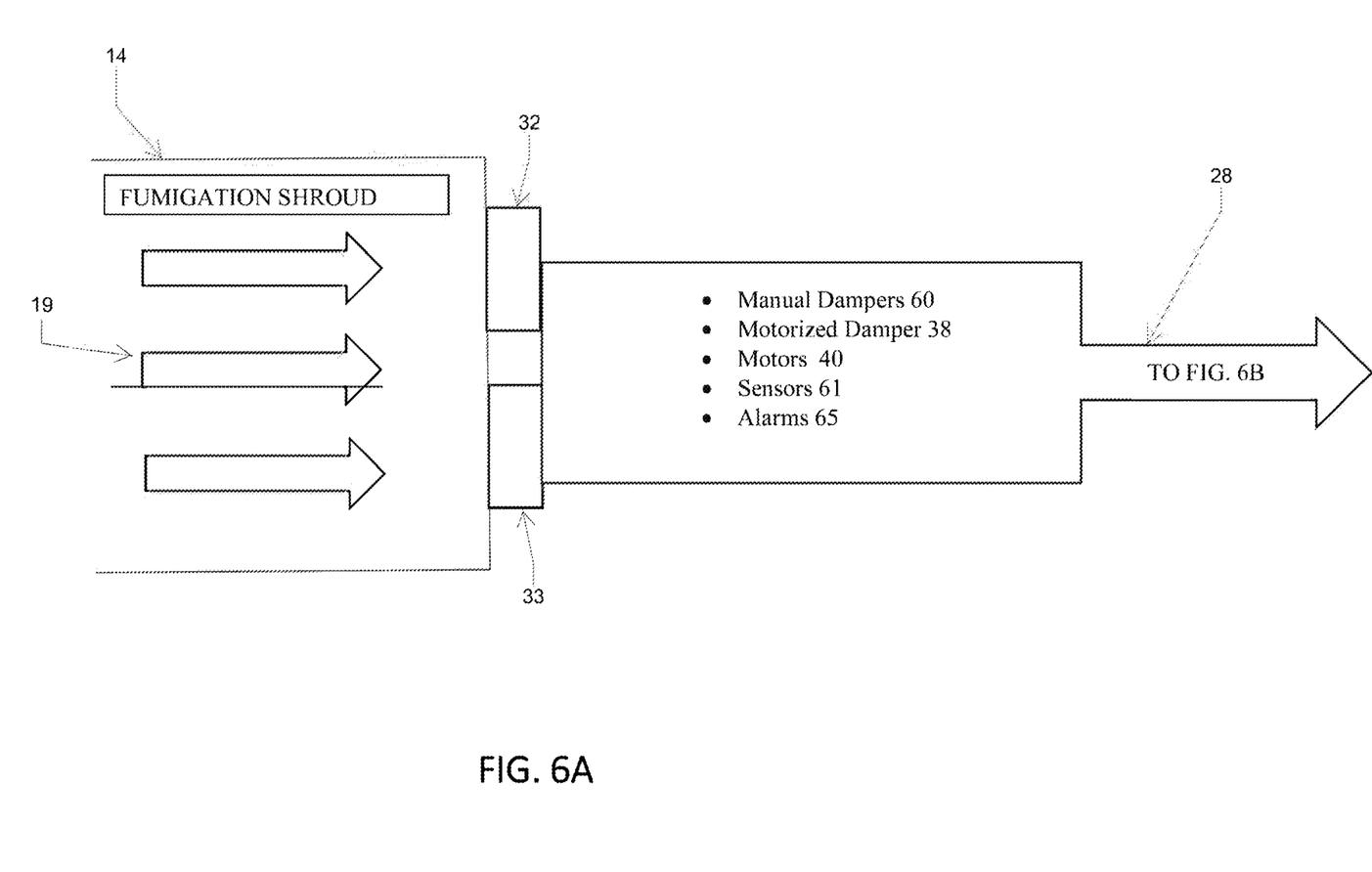
FIGS. 6A and 6B are exemplary flow diagrams showing controls and components for the air flow of an emission system for exhausting fumigant from one or more shroud systems according to aspects and/or embodiments disclosed herein.
Figure 6B:
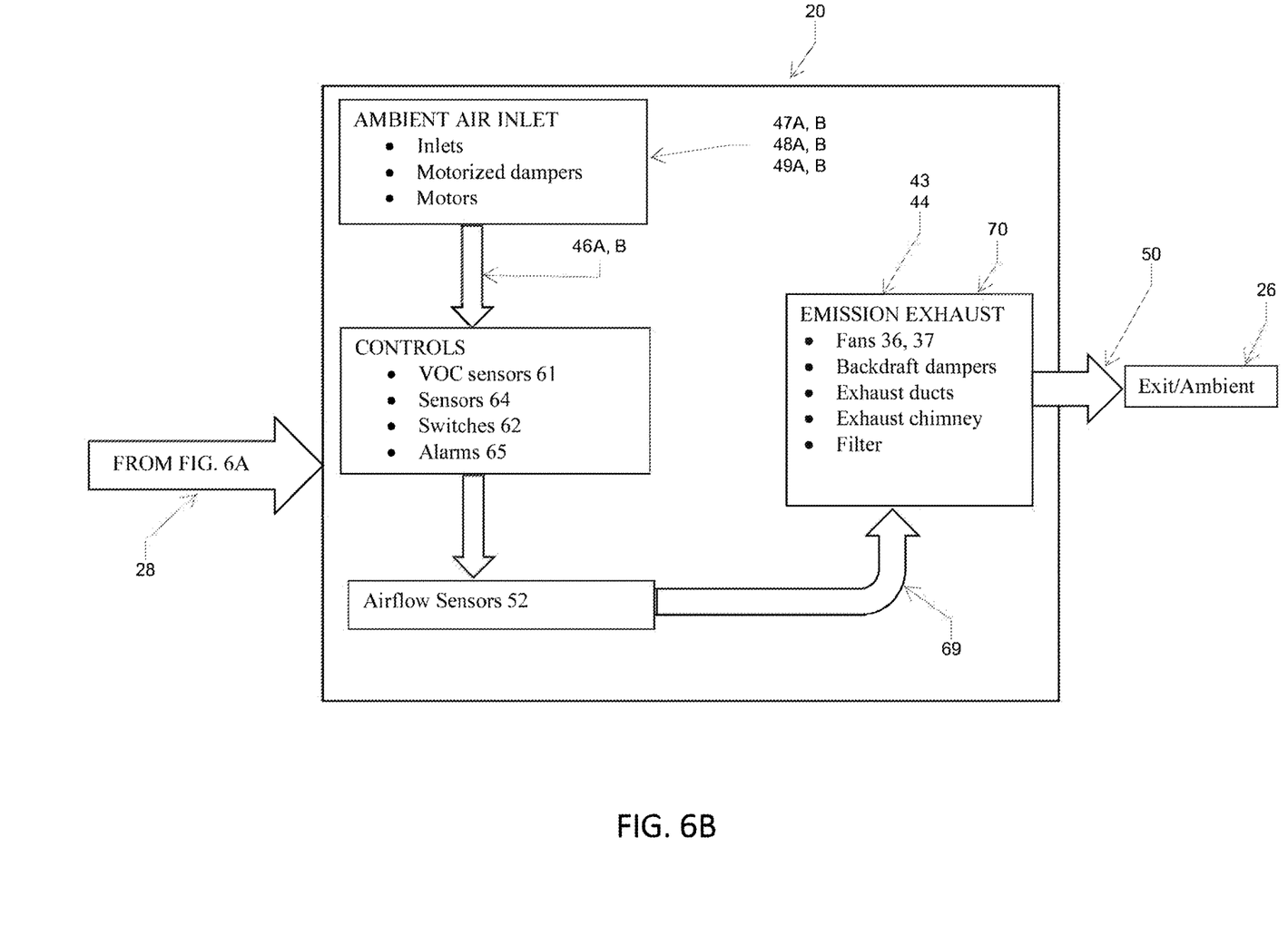

FIGS. 6A and 6B are diagrams, such as flow diagrams showing the flow of air and fumigant according to aspects in our embodiments.

As shown in the figures, a branch configuration including a fumigation shroud 14 is shown. This could be an example of one of the five fumigation shrouds as shown in FIG. 1. The exhaust fans 32, 33 of the emission system 20 draw air in the direction of the arrow 19 through the shroud exits 18 and into the transfer duct 28. In addition, and referring to FIG. 1, it should be appreciated that during operation of the drawing of the fumigant via the exit 18 in the direction of the arrow 19 into the duct system 28, additional fumigant or ambient air will be introduced in the direction of the arrow 17 to the entrance 16 of the shroud or other containment system 14 (e.g., shipping containers, tarps, shrouds, other containers, etc.). The introduction of the air on the entrance side is equally important to maintain pressure in the shroud so as not to collapse the shroud and cut off any ability to draw additional fumigant and other fluids from the shroud and into the emission system. This can be done with a fan or other component that will maintain pressure in the shroud to mitigate collapsing and to keep the flow of air and fumigant moving from the shroud system and towards the emission system 20.

As mentioned, fewer or more fans and/or duct sections than that shown in the figures can be included based on many factors. Such factors include, but are not limited to, the amount of concentration of fumigant, the size and/or area of fumigation, the amount of product being fumigated, and/or any time considerations for removing and/or drawing the fumigant from the product so as to mitigate damage thereof.

The fumigant is moved through the duct 28 as shown in the direction of the arrow in FIG. 6A and can be passed first through or adjacent to any number of components. Such components could include, but are not required or limited to, a damper 60, which can be manually controlled to allow an amount of gas therethrough. A motorized control damper 38 can be controlled by a motor 40 to further control an amount of gas passing therethrough. The figure also shows the inclusion of a sensor 61, which could be a VOC sensor and an associated alarm 65. The VOC sensor can determine a level of VOC (Volatile Organic Compound) or other pollutants or hazardous material contained in the gas moving through the duct 28. If the level sensed by the sensor 61 is above a predetermined threshold, the alarm 65 can be activated to alert an operator of such an increased threshold. The alarm can also be associated with a damper or other blockage member to automatically close to prevent or otherwise mitigate the further fumigant or other fluids to pass therethrough the system, essentially shutting down the system. The alarm can take many forms, and can be audial, visual, or combined, and can be connected in a wired or wirelessly to a remote location, such as to a display or other user interface, so as to indicate to an operator of such high level VOC to shut down the system or otherwise make changes thereto. Such changes could be further opening or closing said damper 38 before the product is moved from the branch and into the remaining portions of the emission system 20. The fumigant also passes moves past the sensor (s) and continues on to the emission system 20 via the duct system 28 onto and/or into the system shown in FIG. 6B. FIG. 6B shows the introduction of the ambient air via the inlets. The ambient air can be controlled in a bleed in manner via dampers 48A, 48B, which are controlled via motors 49 to allow air in the directions of 47A and 47B into the system. The air may pass additional sensors including, but not limited to, switches 62 and/or methyl bromide sensors 64. These may correspondingly be associated with corresponding alarm 65.

Still further, in an automated manner when the sensors indicate a reading above or below an allowable threshold, the alarms can automatically shut down or otherwise change operation of the system accordingly. This could be to allow for more bleed in air to be included with the fumigant or to shut off said bleed in ambient air dampers. The air is then continued through the system as shown in the arrows where they were passed through airflow measuring stations 52. The measuring stations will again determine the volumetric flow of the fluid through the sensors.

The fluid is then continued through backdraft dampers and drawn via the fans 36, 37 into the ducts 43, 44 and entrance 24 of the chimney 22. The backdraft dampers are utilized to mitigate the back transfer of any fluid that has been drawn via the fans 36, 37 and into the inlet ducts 43, 44 so as to attempt to maintain the directional flow of the fumigant fluid into the entrance 24 of the chimney 22 and eventually out of the chimney, such as in the arrow 50 at the exhaust 26 thereof. In addition, as herein disclosed, additional filter 72 could be utilized at any of the locations between the fumigation shroud in set exit 26 of the chimney so as to further filter or otherwise attempt to remove any unwanted particles and/or VOC's or hazardous materials from said fluid.

According to aspects and/or embodiments of the present disclosure, the process of removing the fumigant from the containment system and exhausting the same could be done in a generally continuous manner or could be in an interrupted manner (also referred to as "burping"). For example, in a generally continuous system, the fumigant is continually removed from the containment system via the transfer ducts and fans in a manner in which the fans remain operable to remove the fumigant in a stream-like manner to move the same through the exhaust system. The operation of the fans, ducts, dampers, and the like, could be operational to move the fumigant based, in part, on the volumetric flow of the same, such that the fumigant is moved to a holding tank or ultimately released via the chimney in a manner which complies with the rules and regulations of the location of the system. Such a continuous flow system can be controlled to make sure that the fumigant does not remain in contact with the items being fumigated for too long, which could damage the same.

However, it is further envisioned that the system could be operated in an interrupted or burped manner. In such a system, the ducts, dampers, and fans will be operated to move fumigant from the containment system in volumetric or timed "chunks". The chunks may refer to a volumetric amount of fumigant being moved at a time, wherein the system can be operated to close a damper or shut off a fan in between chunks. In such a situation, there will be some fumigant remaining in the containment system in contact with the items. However, the chunks can be controlled to ensure that the fumigant will not damage the materials based upon the length of time in contact therewith. The burping or chunking of the fumigant through the system will allow for the controlled release to meet the environmental constraints on the amount of fumigant that can be released into the ambient environment for a time period. The burping will be able to meet both constraints, namely, moving the fumigant in a manner to mitigate damage to the items being fumigated, while still exhausting the fumigant to the ambient environment within the regulations required.

As disclosed, the control of the burping can be done via the fans, dampers, ducts, or the like, and can be monitored via any of the sensors in the system. The process can be automated to allow the release of fumigant based on volumetric amount, automated to allow the release of fumigant based on a timed event, or could be manually controlled by an operator. In the event that either volumetric flow or time-based release area used, additional sensors to measure the volumetric flow or time (i.e., a timer or clock) could be incorporated into the system to measure the same.

According to at least some aspects of some of the invention, the chimney 22 can have various heights, for example according to some aspects, the stack can be approximately 140 feet or higher. However, this could be variable depending on the rules and regulations and/or the amount of fumigant to be exhausted via the system. In addition, while the fans can run for predetermined amount of time, such as three hours, this is not to be specific, and can be adjusted to meet regulatory requirements and/or volumetric requirements as well. As regulatory requirements require specific pounds per hour released of fumigant, any of these components that could adjust or vary said exhaust to meet the regulations could be provided while making sure that the fumigant is not exposed to the goods or product being fumigated for longer than necessary, so as to mitigate damage thereto. Instead, the emission system as shown and described allows for the controlled release of fumigant to meet fence line concentration limits in the ambient environment thereof while making sure to remove said fumigant from the product. This balance is important to the operation of the system so as to not damage the goods while also meeting all regulatory requirements.

Still further, the system has been shown and described with regard to relatively large-scale operation for fumigation purposes. In addition, the technology disclosed herein, could be utilized in a lower size and cost standpoint and utilized across the board at any and all import/export facilities. For example, at an export yard, there are fence line concentration limits which can limit efficiencies and throughput. Utilizing the emission system and components thereof as disclosed herein, a controlled emissions stack or chimney can be utilized on a property to allow more efficiency with the slow controlled release being executed in the chimney versus manually throttling operations for hours at a time. This could further include a system that is variable in size to account for varying levels of fumigation and volume of product to be fumigated. Any of the components of the system, including, but not limited to, the containment systems, ducts, and/or exhaust systems, could be variable in size to accommodate variable uses and/or needs. This could include having exhaust systems that are non-fixed, such as part of a trailer system or the like, which could be quickly and easily connectable to any containment system at any location. The non-fixed exhaust system could still be operated in any of the manners disclosed herein to move fumigant from the containment system to an exhaust to meet and comply with any rules and/or regulations needed.

In addition, while the system has been shown and described with respect to fumigation system, it should be appreciated that it could be configured to be used with generally any chemical release that needs to be exhausted and/or filtered in a controlled manner before being released to an ambient environment. For example, many chemicals are regulated such that they cannot be directly released and concentrated levels to ambient air without be characterized as being a pollutant. Therefore, the system in various sizes and/or components, such as that shown in the present disclosure could be fit to the requirements for the emission of any chemical or other pollutant. In addition, the chemicals and/or pollutants could be filtered through the process to further meet any regulatory requirements such that the exhausted fluid contain an appropriate level of chemical or other pollutants such that it does not violate any regulatory rules, laws or other policies.

For exemplary purposes, it is noted that fruits and produce are normally transported under refrigeration to slow the metabolic processes associated with ripening and decay. In particular, fruit must be warmed to about 40° F. for fumigation, since methyl bromide boils at 38.5° F. and must be used in the gaseous state to be effective.

Fumigation is accomplished by sealing the fruit, produce, or other goods in an enclosure and filling the enclosure with methyl bromide or like chemical at a sufficient concentration and temperature, and for a sufficient period of time, to kill the target pest. The fruit is then removed from the enclosure to a cold storage facility to slowly reduce the temperature of the fruit to around 32° F. This cooling process can take as few as two to three days to accomplish, or as many as seven days or more. The actual cooling time depends on the type of packaging material (wooden crates, corrugated cartons, plastic bins, etc.), the configuration of palletized product placed in the cooling chamber, the efficiency of the refrigeration system, target temperature, and other variables. It is known in the art that handling and moving the fruit inherently increases the risk of damage, such as bruising, which lowers the commercial value of the commodity.

As disclosed in the '378 patent, an apparatus forms a chamber enclosing the goods on a surface and includes a canopy that is substantially impermeable to flowable materials, such as gas, liquid, or a combination thereof. The apparatus further includes an upper perimeter for supporting an upper portion of the canopy; a lower perimeter for supporting a lower portion of the canopy; a support structure for supporting the upper perimeter and lower perimeter; and a gasket in communication with the lower perimeter, the gasket being deformable to substantially seal the chamber by compressing the gasket against the surface. In use, the upper perimeter and lower perimeter are fixedly attached to a support structure via a perimeter support. The apparatus may be moveable with respect to the support structure. The lower perimeter may be raised and compressed against the upper perimeter to provide room to place the goods on the surface, then lowered away from the upper perimeter to be placed in proximity to the surface, thereby forming the chamber. The apparatus may also include an intermediate support structure for providing support to the canopy.

In such a system, the goods are fumigated in an efficient manner. However, according to various local, national, and/or international regulations, the timing of exposure to the goods by the fumigating agent, as well as the release of the fumigating agent from the system and/or apparatus can be tightly controlled. It can be vital that the fumigating agent is not exposed to the goods for too long, but the various regulations may also require the release of the fumigating agent be controlled so as to comply with local, state, federal, and country regulations around the release of fumigant to comply with safety standards such as OSHA, fence line, and other short and long term exposure limits as defined by said bodies.

Thus, as disclosed, any of the aspects and/or embodiments disclosed herein could be used to provide quick evacuation of the fumigant gas (e.g., methyl bromide) from the provide, while providing controlled release of the fumigant into the atmosphere.

Therefore, an emission system for exhausting a pollutant and fluid mixture in a controlled manner has been shown and described. As noted, any of the components of the system could be adjusted and/or varied to further control the release and/or exhaust of the fluid, such as in a timed manner or volumetric flow manner. The system could be varied in size and number to be able to manage any amount of chemical, such as fumigate goods or other products. It should be appreciated that alternatives, variables, and other options be included with the system which are obvious to those skilled in the art. Furthermore, it should be appreciated that any components and/or aspect of any of the embodiments shown and described could be combined with any of the other components, embodiments, or aspects shown and/or described, even in manners not explicitly shown and described herein, and which are considered to be part of the present disclosure.

From the foregoing, it can be seen that the invention accomplishes at least all of the stated objectives.

The invention claimed is:

1. A controlled emission system for use with one or more sealed containment systems, comprising:
 an emission chimney;
 at least one duct fluidly connecting each of the one or more sealed containment systems and the emission chimney;
 a fumigation exhaust fan inline with each of the at least one duct to move a fumigant from the one or more sealed containment systems and towards the emission chimney; and
 at least one chimney exhaust fan to move the fumigant through and out the emission chimney;
 wherein the controlled emission system controls a release of the fumigant so as to not damage a good but to maintain an allowable release rate, and further wherein the emission chimney is removable from the one or more sealed containment systems and separately portable.

2. The controlled emission system of claim 1, wherein the at least one duct fluidly connecting each of the one or more sealed containment systems comprises two ducts.

3. The controlled emission system of claim 2, comprising a first fumigation exhaust fan inline with a first duct and a second fumigation exhaust fan inline with a second duct, wherein each of the first and second ducts combine at the emission chimney.

4. The controlled emission system of claim 1, wherein the at least one chimney exhaust fan comprises first and second chimney exhaust fans to direct the fumigant through and out the emission chimney.

5. The controlled emission system of claim 1, wherein each of the at least one ducts combine at the emission chimney.

6. The controlled emission system of claim 1, further comprising a controlled damper inline with and between the at least one duct and the emission chimney to control an amount of fluid passing into the emission chimney.

7. The controlled emission system of claim 1, further comprising at least one bleed air inlet comprising a bleed air motorized damper to control an amount of air to be allowed into the emission chimney.

8. The controlled emission system of claim 1,
wherein the system:
 a. operates in a first configuration wherein the fumigant is continuously moved from the one or more sealed containment systems through and out the emission chimney; and
 b. operates in a second configuration wherein the fumigant is moved in an interrupted manner based upon volume or time to move an amount of the fumigant at a time through and out the emission chimney.

9. The controlled emission system of claim 1, further comprising at least one pollutant sensor inline with the at least one duct to measure an amount of pollutant in the fumigant moving through the at least one duct.

10. The controlled emission system of claim 1, further comprising at least one airflow measuring sensor to measure volumetric flow of the fumigant in the emission system.

11. A method of exhausting a fumigant containing a pollutant from an at least one sealed fumigation system, the method comprising:
 directing a fluid and the pollutant, via a duct and fumigation exhaust fan, from the at least one sealed fumigation system and towards an emission chimney;
 combining the fluid and pollutant with ambient air in the emission chimney; and
 exhausting, via at least one chimney exhaust fan, the combined fluid, pollutant, and ambient air, through and out the emission chimney in a controlled manner,
 wherein the controlled manner includes:
 a. operating in a first configuration wherein the fumigant is continuously moved from the at least one sealed fumigation system through and out the emission chimney; and
 b. operates in a second configuration wherein the fumigant is moved in an interrupted manner based upon volume or time to move an amount of the fumigant at a time through and out the emission chimney.

12. The method of claim 11, further comprising sensing an amount of pollutant in the fluid being directed from the at least one sealed fumigation system and towards the emission chimney.

13. The method of claim 11, further comprising measuring a volumetric flow of the combined fluid, pollutant, and ambient air moving through the emission chimney.

14. The method of claim 11, further comprising controlling, via a motorized control damper, a movement of the fluid and pollutant from the at least one sealed fumigation system towards the emission chimney through the duct.

15. A combined fumigation and emission system, comprising:
 a fumigation system comprising an at least one containment system containing a product and is sealed to receive a fumigant;
 an emission system to exhaust the fumigant in a safe and controlled manner, said emission system comprising:
 an emission chimney;
 at least one duct fluidly connecting the fumigation system and the emission chimney;
 a fumigation exhaust fan inline with each of the at least one duct to move the fumigant from the fumigation system and towards the emission chimney; and
 at least one chimney exhaust fan to move the fumigant through and out the emission chimney, wherein the emission system:
 a. operates in a first configuration wherein the fumigant is continuously moved from the at least one containment system through and out the emission chimney; and
 b. operates in a second configuration wherein the fumigant is moved in an interrupted manner based upon volume or time to move an amount of the fumigant at a time through and out the emission chimney.

16. The combined fumigation and emission system of claim 15, further comprising at least one bleed in duct to allow in a controlled amount of ambient air to mix with the fumigant before exhaust via the emission chimney.

17. The combined fumigation and emission system of claim 15, further comprising at least one filter in the at least one duct or the emission chimney to filter out contaminants from the fumigant.

18. The combined fumigation and emission system of claim 15, further comprising a flow sensor to measure a volumetric flow of the fumigant, and wherein the fumigation exhaust fan and/or the at least one chimney exhaust fan is adjustable based upon the measured volumetric flow from the flow sensor.

* * * * *